United States Patent [19]
Khoury

[11] Patent Number: 5,874,944
[45] Date of Patent: Feb. 23, 1999

[54] VARIABLE VOLTAGE DETECTOR POWER-UP AND POWER-DOWN CIRCUIT FOR A JOYSTICK INTERFACE

[75] Inventor: Elie Georges Khoury, Gilbert, Ariz.

[73] Assignee: VLSI Technology, Inc., San Jose, Calif.

[21] Appl. No.: 748,274

[22] Filed: Nov. 13, 1996

[51] Int. Cl.[6] .................................................. G09G 5/08
[52] U.S. Cl. ........................ 345/161; 345/212; 320/161
[58] Field of Search ................................. 345/211, 212, 345/157, 156, 160, 161; 320/143, 161; 324/76.25, 76.11, 76.18

[56] References Cited

U.S. PATENT DOCUMENTS

| | | | |
|---|---|---|---|
| 3,594,726 | 7/1971 | Fleisher et al. | 340/825.22 |
| 4,114,083 | 9/1978 | Benham et al. | 320/150 |
| 4,306,232 | 12/1981 | Burson | 345/168 |
| 4,687,200 | 8/1987 | Shirai | 273/148 |
| 5,207,426 | 5/1993 | Inoue et al. | 273/148 |
| 5,528,289 | 6/1996 | Cortjens et al. | 348/211 |
| 5,532,476 | 7/1996 | Mikan | 345/161 |
| 5,532,753 | 7/1996 | Buchner et al. | 348/569 |
| 5,680,154 | 10/1997 | Shiga et al. | 345/161 |
| 5,784,051 | 7/1998 | Harrow et al. | 345/161 |

*Primary Examiner*—Daniel J. Wu
*Attorney, Agent, or Firm*—Woodard, Emhardt, Naughton, Moriarty & McNett

[57] ABSTRACT

There is provided herein a joystick interface which includes circuitry to detect when the joystick output signal has been at a steady-state level for a predetermined period of time and upon detection of that condition, the circuitry powers down at least some of the circuitry associated with providing the digital signal representation to the computer. In one particular embodiment of the invention, analog circuitry including a slope detector, makes use of two non-overlapping clocks to sample data and provide it to a comparator. The comparator is used to determine if there has been any change between consecutive or sequential samples, representative of joystick shaft movement. After a predetermined number of comparisons showing no change in either a neutral joystick position or a non-neutral joystick position, the digital circuitry is powered-down to a reduced power operating mode. Upon the detection of change between samples at any single comparator, a signal to return full power to the circuitry in the reduced power mode is provided.

15 Claims, 4 Drawing Sheets

VARIABLE VOLTAGE DETECTOR POWER-UP AND POWER-DOWN CIRCUIT FOR A JOYSTICK INTERFACE

FIELD OF THE INVENTION

The present invention relates generally to the field of electronic controls, and more specifically for a power down control responsive to a lack of joystick activity or a lack of change in joystick activity.

BACKGROUND OF THE INVENTION

Joysticks and joystick interfaces are known in the art which translate a shaft position of the joystick, as manipulated by a user, to an X-Y coordinate position. Joysticks of this type have been used for many tasks, from video game control, wherein the X-Y coordinate position translates to a screen position, to the control of devices unrelated to screen position, such as the control of remote devices. U.S. Pat. No. 5,532,753 to Buchner et al. relating to a remotecontrolled on-screen audio/video receiver control apparatus. The '753 Buchner et al. patent includes a remote controller formed as a pointing device having an operating member, such as, a mouse, a touch panel, a track ball, a joystick, a light pen, or a pointing device as described in the prior art listed therein. Additionally, the '753 Buchner et al. patent it is stated that when the user depresses the operation member initially before the control picture is displayed, the remote controller is switched from the power off or power save mode to the operation mode so as to transmit the remote control signal and to display a control picture. On the other hand, if the operation member is released, the control picture disappears and the remote controller is automatically switched from the operation mode to the power off or power save mode in a predetermined time after the operation member is released.

U.S. Pat. No. 5,528,289 to Cortjens et al. describes a method for automatically adjusting a videoconferencing system camera to center an object. In the '289 Cortjens et al. patent a user, using a mouse, control panel or joystick may command a particular action to be performed at the remote site, such as panning the remote camera to the left or right, tilting the remote camera up or down, etc. The user's actions are converted into network standard control signals and these signals are sent by a converter to the controller. The controller determines the action required at the remote site and sends signals corresponding to the action to a remote controller. In that patent it is stated that if there is no user activity, signified by a lack of activity of mouse, control panel or joystick, then a converter will send a "sleep" signal to the controller, thus causing the controller to go into a standby mode, thereby conserving power.

Although the above patents describe systems wherein a controller or device goes into a low power standby or "sleep" mode when the joystick is not in use (inactive), there is a need for a joystick that can implement a low power standby mode not only when the joystick is not in use (at rest/inactive), i.e. with the shaft in a neutral position, but additionally when in steady state active use, i.e. when the joystick is actively being used and the shaft is in a non-neutral and/or non-centered position along at least one axis.

SUMMARY OF THE INVENTION

A system and method is provided to implement a low power standby mode not only when the joystick is not in use (inactive) with the shaft being in a neutral position, but additionally when in steady state use, i.e. when the joystick is actively being used and the shaft is in a non-neutral position, but there is no change in position of the shaft.

Other objects and advantages of the present invention will become more apparent from the following description of the preferred embodiment.

BRIEF DESCRIPTION OF THE DRAWINGS

The invention is illustrated in the accompanying drawing wherein like elements are denoted by like reference designators and in which.

DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and modifications in the illustrated device, and such further applications of the principles of the invention as illustrated therein being contemplated as would normally occur to one skilled in the art to which the invention relates.

Figure 1:
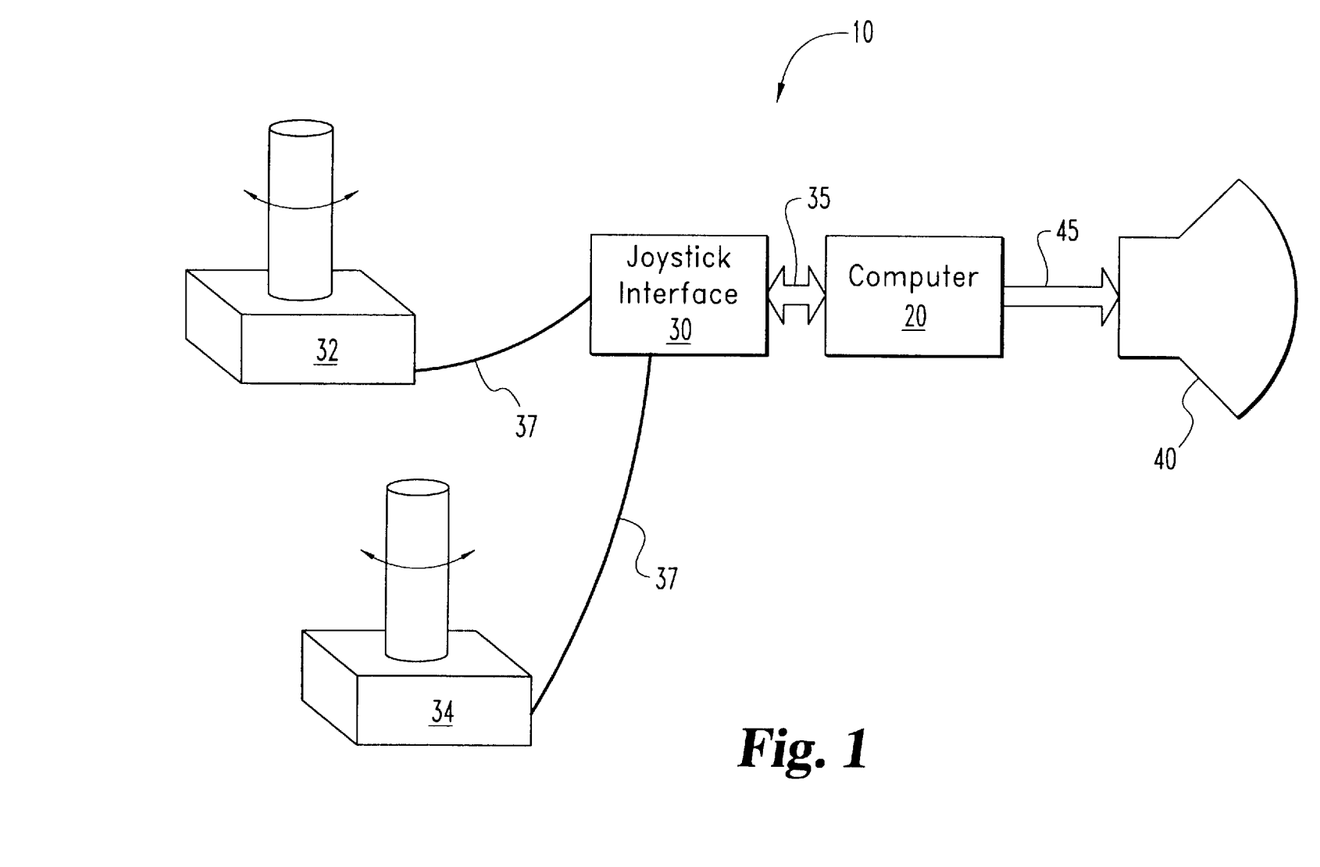
FIG. 1 is a block diagram one embodiment of a computer system utilizing a dual joystick controller and including a joystick interface of a type described herein.

Referring now specifically to FIG. 1 there is shown a system 10 in accordance with one particular embodiment of the present invention. System 10 includes a computer 20, a joystick interface 30 in communication with the computer 20, joysticks 32 and 34 in communication with the joystick interface 30 and a display 40 in communication with computer 20. Note that although this particular embodiment is shown and preferred, the present invention can be used in connection with other joystick related systems, such as that shown in the Cortjens and Buchner patents described above. Additionally, although shown as being connected to the joystick interface by wires 37, joysticks 32 and 34 may be of a type presently known in the art as being wireless and communicating with the interface via infra-red. Further, the joystick interface can be used with one or more joysticks, and should not be limited to two joysticks, as shown in the preferred embodiment.

Figure 2:
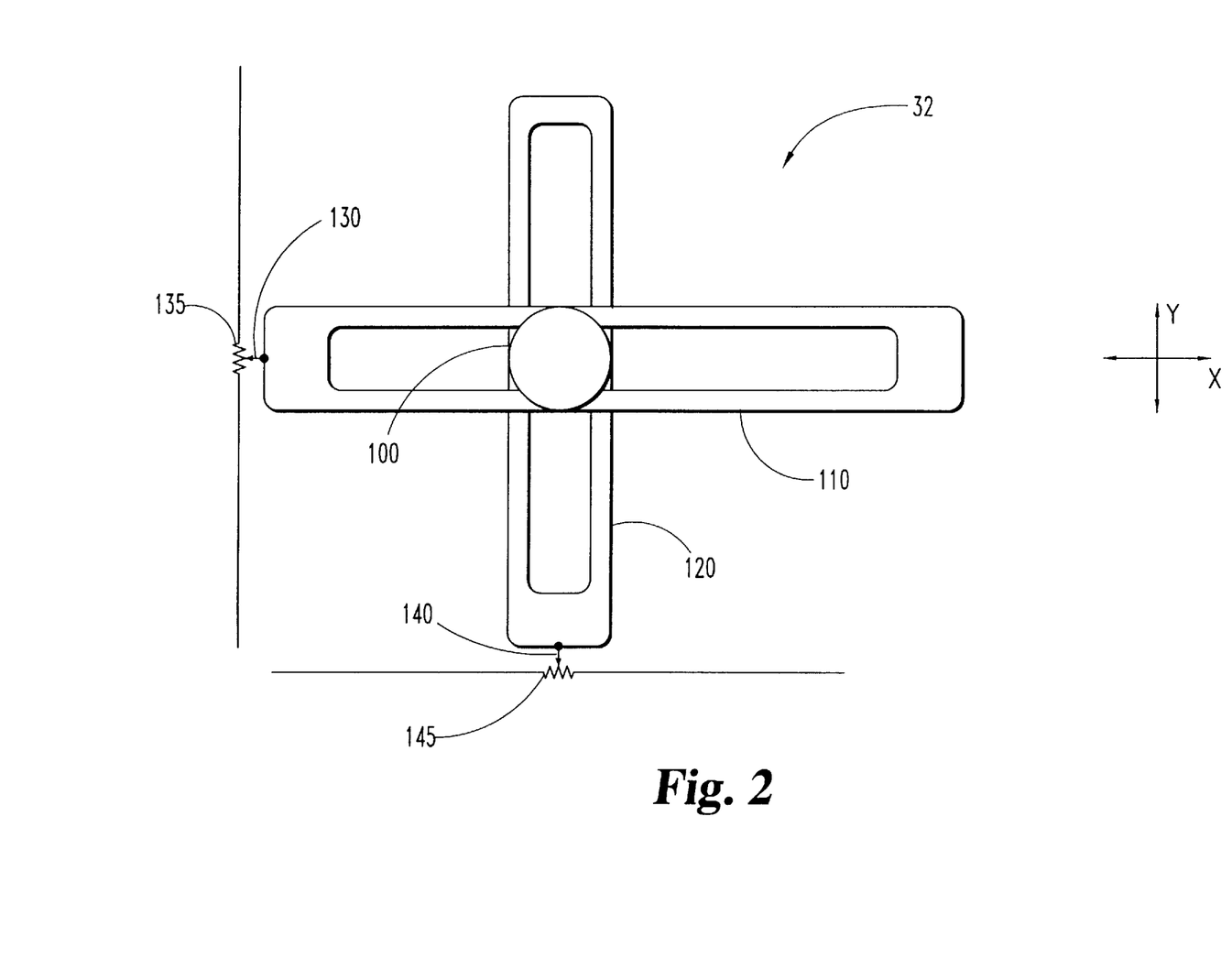
FIG. 2 is a diagram of the internal mechanism of one type of known joystick which may be used with the present invention.

Referring now to FIG. 2, there is shown a diagram representative of the internal configuration of one type of joystick such 32 and 34 in FIG. 1. The joystick of FIG. 2 includes a shaft 100, which is connected through displacement members or armatures 110 and 120. Armatures 110 and 120 are connected at one end to the wipers 130 and 140 of variable resistors 135 and 145, respectively. When the shaft is moved along an X-Y direction, the armatures 110 and 120 are moved a corresponding amount, thus moving the wipers 130 and 140. The output voltage across the variable resistors 135 and 145, using a conductive the conductive wiper as one terminal, corresponds to an X coordinate and a Y coordinate for the desired position. These X and Y position voltages are provided to the joystick interface 30 of FIG. 1. Joysticks of this type have a neutral position (for example, a centered position) to which the shaft, and correspondingly the armatures, return when the shaft is released and the joystick is not in use.

Although the preferred embodiment is described, it is not meant to be limiting. The power-down circuit of the present invention may be adapted to work with many types of joystick devices, including digital encoder type joysticks, one such joystick being described in U.S. Pat. No. 4,306,232 to Burson, that patent being incorporated by reference herein. Further the present invention may be adapted to work with power pads currently known in the art, such as those described in U.S. Pat. Nos. 5,207,426 to Inoue et al. and 4,687,200 to Shirai, those patents being incorporated herein by reference. The variable resistor model of joystick is being used herein for example only.

In a preferred embodiment of the present invention, the joystick interface 30 of FIG. 1 includes circuitry, such as an A/D converter and an ASIC for controlling the A/D converter, for providing a digital signal representation of the joystick X-Y coordinates to a computer. Additionally, the joystick interface 30 includes circuitry to detect when the joystick output signal has been at a steady-state level of operation for a predetermined period of time and upon detection of that condition, the circuitry powers down at least some of the circuitry associated with providing the digital signal representation to the computer. In one particular embodiment of the invention, analog circuitry including a slope detector is used to detect the steady-state joystick condition. The slope detector is used to determine if there has been joystick shaft movement between consecutive or sequential samples. After a predetermined number of samples showing no change, the digital circuitry is powered down. Upon the detection of change between samples, the output of the comparator may pulse between low and high, and the circuitry is provided with a power-up signal thus exiting the standby or sleep mode.

Figure 3:
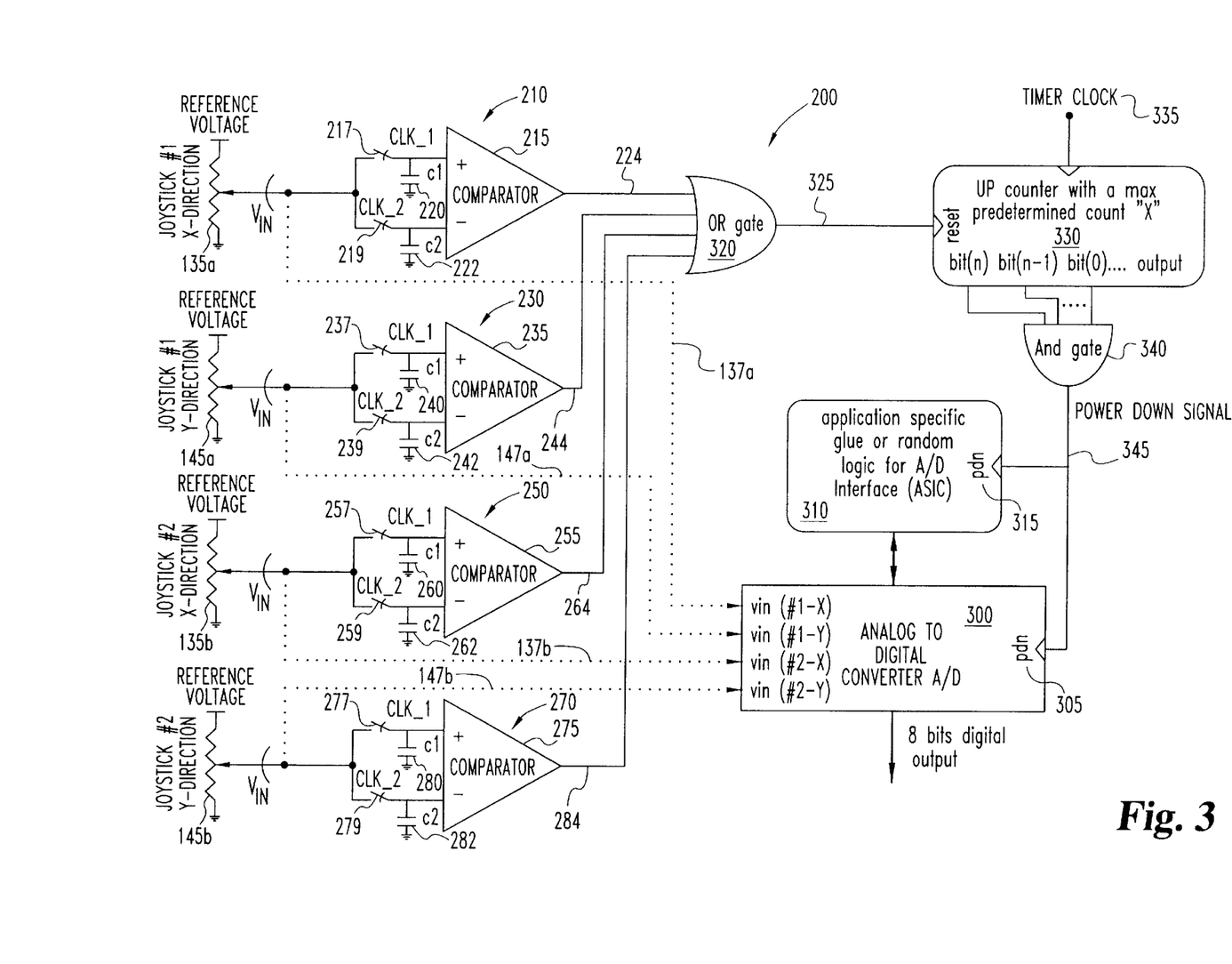
FIG. 3 is a block diagram of one embodiment of the present invention used in connection with the joystick of FIG. 2.

Referring specifically to FIG. 3, a schematic diagram of a joystick interface 200 made in accordance with one particular embodiment of the present invention is shown. The joystick interface 200 is configured for use with two variable resistor type joysticks, as described herein. Although the above variable resistors are shown in FIG. 3, they are not necessarily part of the interface 200 and in the preferred embodiment are separate from and in communication with the joystick interface 200. Each variable resistor, or joystick channel, provides a voltage representative of the X or Y position of the joystick armature to the A/D converter 300. A/D converter includes a power-down input PDN 305 which may be used to power up and power down the A/D converter when a signal is received at that input PDN 305. The A/D converter 300 is controlled by an application specific glue or random logic ASIC 310 which also includes a power-down input PDN 315.

The joystick interface 200 further includes analog circuitry for controlling the power-up/power-down condition of the A/D converter 300 and ASIC 310. This analog circuitry is constantly powered while the interface 200 is in operation. Each joystick channel is in communication with one slope detector. For example, slope detector 210 receives an input voltage representative of the desired the X-coordinate from the variable resistor 135a of the joystick 32 of FIG. 1. Correspondingly, slope detectors 230, 250 and 270 receive representative voltages from variable resistors 145a (Y-coordinate of joystick 32), 135b (X-coordinate of joystick 34 of FIG. 1) and 145b (Y-coordinate of joystick 32), respectively.

Additionally, as shown in FIG. 3, slope detector 210 includes a comparator 215 having both the positive (+) input and negative (−) inputs connected to the wiper of the variable resistor 135a, each through a switch 217 and 219, respectively. Switches 217 and 219 may have an open-close/single pole single throw functionality type switch, such type including transistor switches as well as other types of switch. When switch 217 is closed the voltage level of the storage capacitor 220 is brought to the voltage across the variable resistor 135a. When the switch 217 is reopened the voltage stored on the capacitor 220 is provided to the positive (+) input of the comparator 215. Similarly, when switch 219 is closed the voltage level of the storage capacitor 222 is brought to the voltage across the variable resistor 135a. When the switch 219 is reopened the voltage stored on the capacitor 222 is provided to the positive (−) input of the comparator 215. A comparison is made by the comparator and the result is provided to the OR gate 320 via line 224. If the value voltage at the positive (+) input to the comparator is greater than that at the negative input, the output of the comparator 215 will be $V_{DD}$ or "high", which results in the output of the OR gate 320 being high. If the value on storage capacitor 220 is equal to the value stored on storage capacitor 222, the output to the comparator 215 will be $V_{SS}$ or "low". . Similarly, if the voltage at the negative (−) input to the comparator 215 is greater than that at the positive (+) input, the output to the comparator 215 will be $V_{SS}$ or "low".

Figure 4:
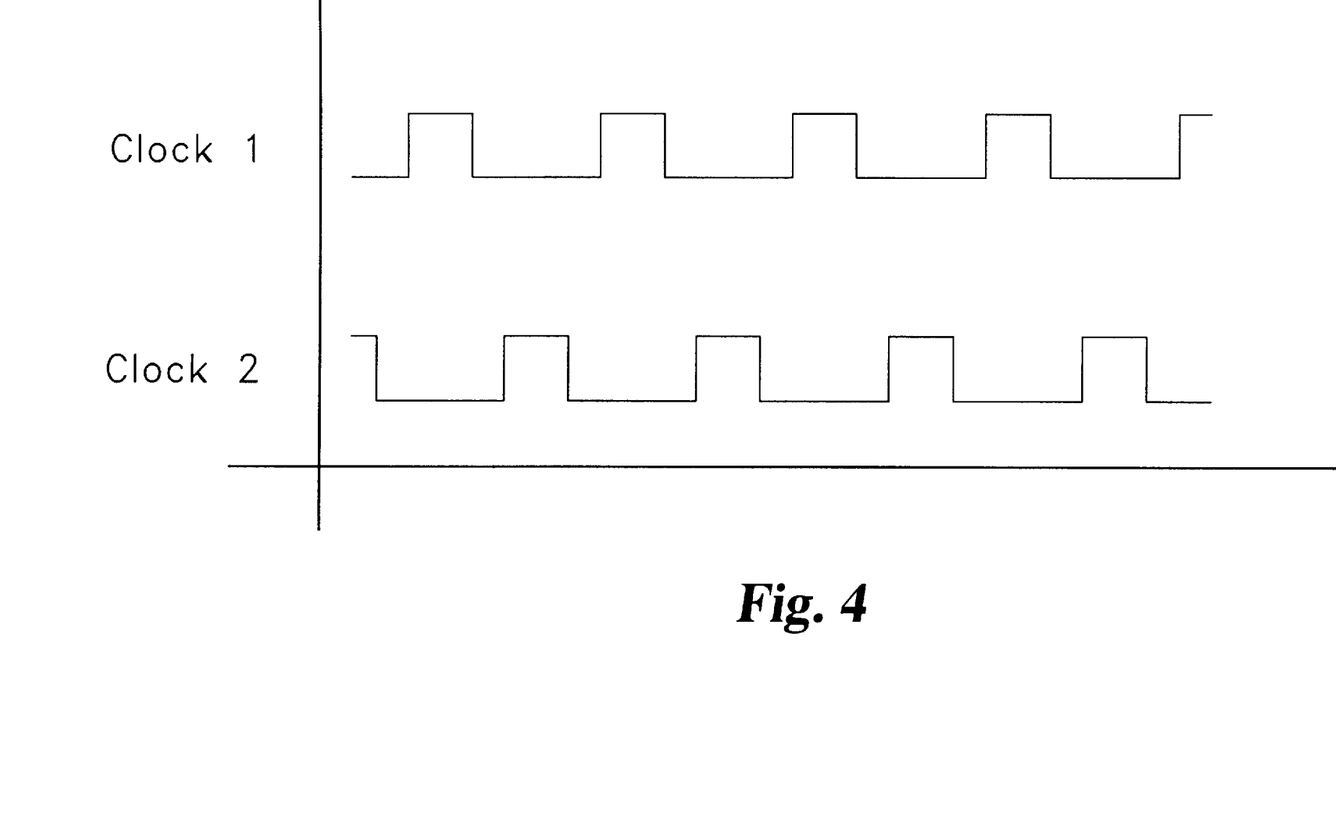
FIG. 4 is a timing chart showing the pulse train output of two non-overlapping clocks used in one embodiment of the present invention.

Referring now to FIG. 4 in connection with FIG. 3, there is shown two non-overlapping clocks Clock 1 and Clock 2. Preferably, Clocks 1 and 2 may be derived from or the same as the system clock or the timer clock 335 and may be on the order of from a few kilohertz to several megahertz. A first edge of Clock 1 is used to close switch 217, while the second edge is used to reopen the switch 217. Likewise, a first edge of Clock 2 is used to close switch 219, while the second edge is used to reopen the switch 219. Because the clock pulses are non-overlapping, the storage capacitors 220 and 222 are always charged at different points in time.

In operation, $V_{in}$ from the variable resistor 135a at the leading edge of a clock pulse from clock 1 will be compared to $V_{in}$ stored at the trailing edge of a clock pulse from clock 2, and vice-versa. Thus, if there is no change in joystick position along the X-channel of joystick 1, in two successive clock pulses (one clock pulse on each of clocks 1 and 2), then the values stored to storage capacitor 220 and 222 will be the same and the output of comparator 215 will be low. If $V_{in}$ from the variable resistor 135a was steadily rising or falling over time, because the samples are being stored to the storage capacitors 220 and 222 in an alternating fashion based on the two non-overlapping clocks of FIG. 4, the output of the comparator 215 will continuously toggle between $V_{ss}$ and $V_{DD}$.

For example, where $V_{in}$ is steadily rising, and assuming that at time t=0 on both clock 1 and clock 2 that $V_{positive}=V_{negative}=V_{in}$, at the first clock pulse of clock 1, a new value is loaded to the storage capacitor 220 which value is greater than $V_{in}$, so the output of the comparator 215 will be high until the first pulse of clock 2. With $V_{in}$ rising, when switch 219 is closed at the leading edge of the first clock pulse from clock 2, $V_{negative}$ will now be greater than $V_{positive}$ and the comparator 215 output will be low. If $V_{in}$ is still rising, at the leading edge of the second pulse on clock 1, the switch 217 will close and $V_{positive}$ will again be greater than $V_{negative}$ and the comparator 215 output will again be high. It can be seen that the comparator output toggles in a similar manner when $V_{in}$ is steadily decreasing.

Slope detectors 230, 250 and 270 operate in the same way as described in connection with slope detector 210. Switches 237, 257 and 277 open and close in response to Clock 1, as with switch 217. Switches 239, 259 and 279 open and close in response to Clock 2, as with switch 219. Further, slope detectors 230, 250 and 270 provide outputs to the OR gate 320 via lines 244, 264 and 284, respectively. As such, if the output of any one of the comparators 215, 235, 255 or 275 is high, the output of the OR gate 320 will be high.

The output from the OR gate 320 is provided to the reset input of an up-counter 330, via line 325. The incrementing of the up-counter 330 is controlled by the timer clock 335. Preferably, the timer clock 335 may be derived from the system clock and may be on the order of from a few kilohertz to several megahertz. If the count of up-counter 330 reaches a predetermined number "X" before being reset, a power down signal is provided over line 34 converter 300 and the ASIC 310 via the PDN inputs 305 and 315. Preferably, the speed of the timer clock 335 will be chosen so that the up-counter 330 will take from between one second and ten seconds of steady state joystick output before reaching a full count and providing a power-down signal to the A/D converter 300 and the ASIC 310. More preferably, the timer clock rate will be chosen to cause the up counter 330 to reach a full count after a few seconds of steady state joystick output. In one preferred embodiment a 10 bit up-counter is used and the outputs of all of the bit registers are provided to an AND gate 340. When all bits are high, meaning that the full count of 1,024 system clock pulses has been counted, the output of the AND gate 340 goes high and the signal is relayed to the power down inputs 305 and 315, thus causing the A/D converter 300 and the ASIC 310 to go into a low power standby or "sleep" mode. So long as the signal provided to the PDN inputs 305 and 315 from the AND gate 340 is high, the AND converter 300 and ASIC 310 will be in the reduced power standby or "sleep" mode. If any slope detector output goes high, a high output produced by the OR gate 320 is used to reset the up-counter 330 to zero, thus the output from the AND gate 340 on line 345 goes low and the ASIC 310 and A/D converter 300 return to the normal power operation mode. It can be seen that the AND gate 340 may be omitted and the line 345 may be connected to the output from the most significant bit location of the up-counter, if a shorter time period is desired. Alternatively, up-counters having lesser maximum count values may be used.

Although the slope detector of FIG. 3 is described herein in connection with a joystick, that is not meant to be limiting. The slope detector of the present invention may be used with a number of different applications wherein it is necessary to determine when a change in slope has occurred.

In use, the joystick interface of the present invention will allow some portion of the system, i.e. the A/D converter 300 and the ASIC 310, to enter a reduced power standby mode not only when the joystick is inactive with the shaft being in a neutral or centered position, but additionally when the joystick is actively in use, having at least one joystick voltage in representative of a non-neutral or non-centered position value, and where the output of the joystick is steady state. This will be of use when a joystick is manipulated in one direction for a period of time.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, a joystick interface as described, may be incorporated into the circuitry of a VCR or other type of television product or into any system making use of a joystick such as remote manipulation of devices. Further, the slope detector of the preferred embodiment may be used independent of a joystick interface.

What is claimed is:

1. An electronic joystick controller for use with a joystick including a positional shaft, said joystick generating at least a first signal corresponding to positional shaft movements along an X-axis or a Y-axis, said joystick controller comprising:

a processing circuit connected to the joystick to receive the first signal, said processing circuit for processing said first signal from said joystick, said processing circuit including a first reduced power operating mode and a second full power operating mode;

a controller additionally connected to the joystick to receive said first signal for receiving and sampling said first signal and for providing to said processing circuit a first controller output having (a) a first state if no change is detected between non-neutral shaft position value sequential samples and if no change is detected between neutral position value sequential samples and (b) a second state if change is detected between either at least two sequential non-neutral shaft postion value samples or sequential neutral and non-neutral shaft position value samples; and wherein said processing circuit enters said reduced power mode upon receiving said first controller output of a first state and wherein said processing circuit enters said full power mode upon receiving said controller output of said second state.

2. An electronic controller, comprising:

at least one signal generator for providing a first signal;

a processing circuit connected to said at least one signal generator for processing said first signal from said generator;

a power supply connected to said processing circuit for powering said processing circuit;

a power down circuit connected between said processing circuit and said power supply for switching said processing circuit to one of a reduced power mode wherein said processing circuit uses a reduced amount of power and a power up mode wherein said processing circuit uses a greater amount of power sufficient to power said processing circuit for full operation of said processing circuit;

at least one detector in communication with said at least one signal generator for receiving said first signal, sampling said first signal and detecting change in at least two consecutive samples of said first signal, said at least one detector providing a detector output having a first detector state if no change is detected between non-neutral position value consecutive samples and having a second detector state if change is detected between at least two of said consecutive samples;

a counter in communication with said at least one detector to receive said detector output and to provide a counter output to said power down circuit, said counter output having a first counter state after a predetermined number of consecutive detector outputs of said first detector state are received, said counter output having a second counter state after receiving a detector output of said second detector state;

wherein said power down circuit is in said power down mode when said first counter state is received and wherein said power down circuit is in said power up mode when said second counter state is received.

3. The electronic controller of claim 2, wherein said detector additionally provides a detector output having a first detector state if no first signal is received from said at least one signal generator.

4. The electronic controller of claim 3, wherein said electronic controller comprises a joystick controller.

5. The electronic controller of claim 4, wherein said processing circuit includes an A/D converter.

6. The electronic controller of claim 5, wherein said at least one signal generator includes at least two signal generators and said at least one detector includes at least first and second detectors, and wherein each of said signal generators is in communication with one of said detectors.

7. The electronic controller of claim 6, wherein said at least first detector and said at least second detector comprise a first slope detector and a second slope detector, respectively.

8. The joystick and controller of claim 7, wherein said at least first slope detector comprises,
- a first switch, including a first switch input and a first switch output, said first switch input being connected to receive said first signal, said first switch being normally open;
- a second switch, including a second switch input and a second switch output, said second switch input being connected to receive said first signal, said second switch being normally open;
- a comparator including a positive input and a negative input and a comparator output terminal, said positive input being connected to said first switch output, said negative input being connected to said second switch output;
- a first storage capacitor connected between said first switch output and a reference level;
- a second storage capacitor connected between said second switch output and a reference level;
- a first clock for providing a continuous stream of first clock pulses;
- a second clock for providing a continuous stream of second clock pulses;
- wherein no clock pulse in said continuous stream of second clock pulses overlaps any clock pulse of said continuous stream of first clock pulses;
- wherein each clock pulse from said continuous stream of first clock pulses causes said first switch to close for the duration of said each clock pulse from said continuous stream of first clock pulses and wherein each clock pulse from said continuous stream of second clock pulses causes said second switch to close for the duration of said each clock pulse from said continuous stream of second clock pulses; and
- wherein the output of said comparator is high when said voltage at said positive input is greater than said voltage at said negative input and wherein the output of said comparator is low when the voltage at said positive input is less than or equal to the voltage at said negative input.

9. A joystick and controller, comprising:
- a joystick including a positional shaft, said joystick generating at least a first signal corresponding to positional shaft movements along an X-axis and at least a second signal corresponding to positional shaft movements along a Yaxis, said joystick providing said at least first and second signals to a processing circuit;
- a processing circuit connected to said joystick for processing said first and said second signals from said joystick, said processing circuit including an A/D converter;
- a power supply connected to said processing circuit for powering said processing circuit;
- a power down circuit connected between said processing circuit and said power supply for switching said processing circuit to one of a power down mode wherein said processing circuit uses a reduced amount of power and a power up mode wherein said processing circuit uses a greater amount of power sufficient to power said processing circuit for full operation of said processing circuit;
- at least a first detector in communication with said joystick to receive said first signal, sampling said first signal and detecting change in consecutive samples of said first signal, said first detector providing a first detector output having a first detector state if no change is detected between non-neutral value consecutive samples and if no change is detected between neutral value consecutive samples and having a second detector state if change is detected between said consecutive samples;
- at least a second detector in communication with said joystick to receive said second signal, sampling said second signal and detecting change in consecutive samples of said second signal, said second detector providing a second detector output having a first detector state if no change is detected between non-neutral value consecutive samples and if no change is detected between neutral value consecutive samples and having a second detector state if change is detected between said consecutive samples;
- a counter block in communication with said at least first and second detectors to receive said first and second detector outputs and to provide a counter output to said power down circuit, said counter output having a first counter state after a predetermined number of consecutive detector outputs of said first detector state are received from both said at least first and second detectors, said counter output having a second counter state after receiving a detector output of said second detector state from either of said at least first and second detectors;
- wherein said power down circuit is in said power down mode when said first counter state is received and wherein said power down circuit is in said power up mode when said second counter state is received.

10. The joystick and controller of claim 9, wherein said at least first detector and said at least second detector comprise a first slope detector and a second slope detector, respectively.

11. The joystick and controller of claim 10, wherein said first slope detector comprises,
- a first switch, including a first switch input and a first switch output, said first switch input being connected to receive said first signal, said first switch being normally open;
- a second switch, including a second switch input and a second switch output, said second switch input being connected to receive said first signal, said second switch being normally open;
- a comparator including a positive input and a negative input and a comparator output terminal, said positive input being connected to said first switch output, said negative input being connected to said second switch output;

a first storage capacitor connected between said first switch output and a reference level;

a second storage capacitor connected between said second switch output and a reference level;

a first clock for providing a continuous stream of first clock pulses;

a second clock for providing a continuous stream of second clock pulses;

wherein no clock pulse in said continuous stream of second clock pulses overlaps any clock pulse of said continuous stream of first clock pulses;

wherein each clock pulse from said continuous stream of first clock pulses causes said first switch to close for the duration of said each clock pulse from said continuous stream of first clock pulses and wherein each clock pulse from said continuous stream of second clock pulses causes said second switch to close for the duration of said each clock pulse from said continuous stream of second clock pulses; and wherein the output of said comparator is high when said voltage at said positive input is greater than said voltage at said negative input and wherein the output of said comparator is low when the voltage at said positive input is less than or equal to the voltage at said negative input.

12. The joystick and controller of claim 10, wherein said joystick and controller includes a second joystick, wherein said second joystick generates a third signal corresponding to positional shaft movement along a x axis and a fourth signal corresponding to positional shaft movement along a y axis, wherein said joystick and controller includes a third analog slope detector to receive said third signal, sample said third signal and detecting change in consecutive samples of said third signal, said third detector providing a third detector output having a first detector state if no change is detected between at least two non-neutral position value consecutive samples and if no change is detected between neutral value consecutive samples and having a second detector state if change is detected between at least two said consecutive samples, and wherein said joystick and controller includes a fourth analog slope detector to receive said fourth signal, sample said fourth signal and detecting change in consecutive samples of said fourth signal, said fourth detector providing a fourth detector output having a first detector state if no change is detected between non-neutral position value consecutive samples and if no change is detected between neutral position value consecutive samples and having a second detector state if change is detected between at least two of said consecutive samples.

13. The joystick and controller of claim 12, wherein said counter block includes an or gate and a clock driven counter including a reset input and an output, wherein said first, second, third and fourth detector outputs are provided to the inputs of said or gate and the output of said or gate is provided to said reset input of said counter, whereby a high state output from said or gate resets said counter, and wherein said output of said clock driven counter goes to a high state when said counter reaches a predetermined count.

14. A slope detector, comprising:

a variable voltage source;

a first switch, including a first switch input and a first switch output, said first switch input being connected to said variable voltage source, said first switch being normally open;

a second switch, including a second switch input and a second switch output, said second switch input being connected to said variable voltage source, said second switch being normally open;

a comparator including a positive input and a negative input and a comparator output terminal, said positive input being connected to said first switch output, said negative input being connected to said second switch output;

a first storage capacitor connected between said first switch output and a reference level;

a second storage capacitor connected between said second switch output and a reference level;

a first clock for providing a continuous stream of first clock pulses;

a second clock for providing a continuous stream of second clock pulses;

wherein no clock pulse in said continuous stream of second clock pulses overlaps any clock pulse of said continuous stream of first clock pulses;

wherein each clock pulse from said continuous stream of first clock pulses causes said first switch to close for the duration of said each clock pulse from said continuous stream of first clock pulses and wherein each clock pulse from said continuous stream of second clock pulses causes said second switch to close for the duration of said each clock pulse from said continuous stream of second clock pulses; and wherein the output of said comparator is high when said voltage at said positive input is greater than said voltage at said negative input and wherein the output of said comparator is low when the voltage at said positive input is less than or equal to the voltage at said negative input.

15. The slope detector of claim 14, wherein said slope detector is used in a joystick interface, wherein said slope detector is used to detect relative change in joystick output over time.

* * * * *

UNITED STATES PATENT AND TRADEMARK OFFICE
CERTIFICATE OF CORRECTION

PATENT NO. : 5,874,944
DATED : February 23, 1999
INVENTOR(S) : Elie Georges Khoury It is certified that error appears in the above-identified patent and that said Letters Patent is hereby corrected as shown below:

In column 4, line 24, please delete the second period following the word "low".
In column 5, line 15, please change "line 34 converter" to --line 345 to the A/D converter--.
In column 5, line 33, please change "AND" to --A/D--. (2nd occurrence)
In column 7, line 66, please change "Yaxis" to --Y-axis--.

Signed and Sealed this

Twenty-fifth Day of April, 2000

Attest:

Q. TODD DICKINSON

*Attesting Officer*  *Director of Patents and Trademarks*